US011039367B1

(12) United States Patent
Vivanco et al.

(10) Patent No.: US 11,039,367 B1
(45) Date of Patent: Jun. 15, 2021

(54) ADJUSTING SCANNING PERIOD INTERVAL CONDUCTED BY A DUAL CONNECTIVITY CAPABLE COMMUNICATION DEVICE FOR 5G OR OTHER NEXT GENERATION WIRELESS NETWORK

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); Mark Stockert, San Antonio, TX (US); Slawomir Stawiarski, Carpentersville, IL (US)

(73) Assignees: AT&T INTELLECTUAL PROPERTY I, L.P., Atlanta, GA (US); AT&T TECHNICAL SERVICES COMPANY, INC., Vienna, VA (US)

( * ) Notice: Subject to any disclaimer, the term of this patent is extended or adjusted under 35 U.S.C. 154(b) by 7 days.

(21) Appl. No.: 16/710,422

(22) Filed: Dec. 11, 2019

(51) Int. Cl.
| | |
|---|---|
| H04W 4/00 | (2018.01) |
| H04W 36/32 | (2009.01) |
| H04W 24/10 | (2009.01) |
| G06F 17/18 | (2006.01) |
| H04W 76/15 | (2018.01) |
| H04W 36/08 | (2009.01) |

(52) U.S. Cl.
CPC .......... *H04W 36/32* (2013.01); *G06F 17/18* (2013.01); *H04W 24/10* (2013.01); *H04W 36/08* (2013.01); *H04W 76/15* (2018.02)

(58) Field of Classification Search
CPC ..... H04W 36/32; H04W 76/15; H04W 24/10; H04W 36/08; G06F 17/18
USPC ........................................................ 370/331
See application file for complete search history.

(56) References Cited

U.S. PATENT DOCUMENTS

| 10,652,787 B2* | 5/2020 | Gupta ................ H04W 4/02 |
| 10,659,132 B2* | 5/2020 | Raghavan ............ H04B 7/043 |
| 2020/0314629 A1* | 10/2020 | Kreishan ............ H04W 24/08 |
| 2021/0022062 A1* | 1/2021 | Vivanco ............. H04W 36/32 |

* cited by examiner

Primary Examiner — Amancio Gonzalez
(74) Attorney, Agent, or Firm — Amin, Turocy & Watson, LLP

(57) ABSTRACT

Measurement procedures are provided for a communication device. For instance, a system that comprises determining a probability value, wherein the probability value indicates a likelihood of a communication device, connected to a first network node device, connecting to a second network node device with attempts below a first threshold. The system can also comprise determining a scanning period interval value based on the probability value, used by the communication device, to adjust a scanning procedure usable for establishment of a connection with the second network node device, and requesting the communication device to utilize the scanning period interval value during the establishment of the connection with the second network node device.

20 Claims, 9 Drawing Sheets

US 11,039,367 B1

ADJUSTING SCANNING PERIOD INTERVAL CONDUCTED BY A DUAL CONNECTIVITY CAPABLE COMMUNICATION DEVICE FOR 5G OR OTHER NEXT GENERATION WIRELESS NETWORK

TECHNICAL FIELD

This disclosure relates generally to measurement procedure for a communication device. More specifically, facilitating adjusting scanning period interval conducted by a communication device capable of dual connectivity, e.g., for 5th generation (5G) or other next generation wireless network.

BACKGROUND 5G wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. As 5G network nodes are deployed, the core network utilizes 4G network nodes and the 5G network nodes for transferring data. A user equipment (US) capable of dual connectivity can utilize a 4G network node (e.g., eNodeB) and the 5G network node (e.g., gNodeB). A communication device capable of dual connectivity can be connected to, for example 4G network node and while connected can conduct measurements to identify, for example 5G network node. Conducting additional measurements frequently can drain battery charge.

The above-described background relating to relating dual connectivity, measurements and impact of frequent measurements, is merely intended to provide a contextual overview of some current issues, and is not intended to be exhaustive (e.g., although problems and solution are directed to next generation networks such as 5G, the solutions can be applied to 4G/LTE technologies). Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
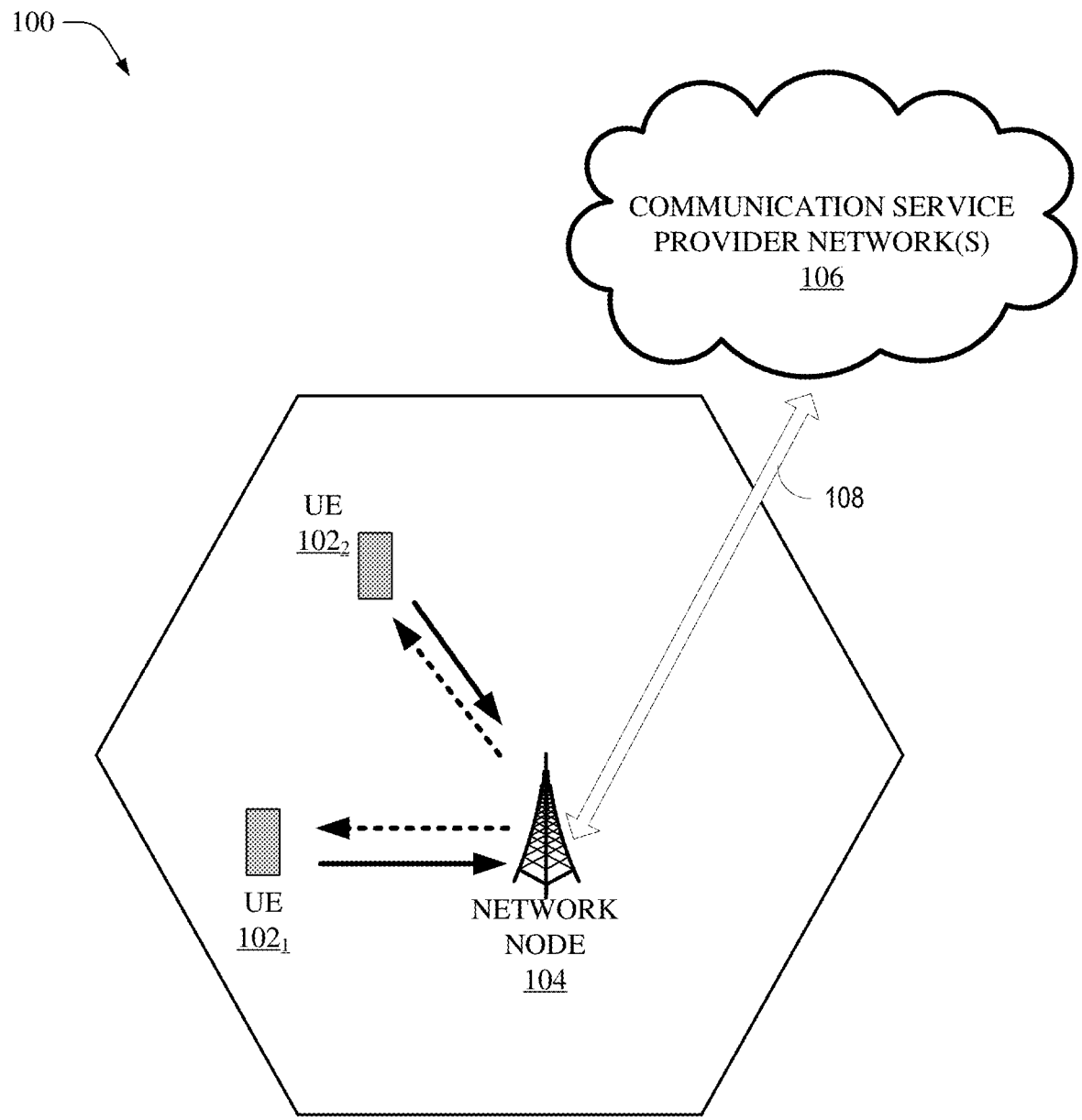
FIG. 1 illustrates a non-limiting example of a wireless communication system in accordance with various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate adjusting scanning period interval conducted by a communication device capable of dual connectivity. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate adjusting scanning period interval conducted by a communication device capable of dual connectivity. Facilitating adjusting scanning period interval conducted by a communication device capable of dual connectivity can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

3GPP LTE-eNB triggers inter-frequency/inter-RAT measurement when signal power (RSRP) of serving frequency is below a pre-defined threshold (e.g., B1_Threshold). There are no standards for adjusting B1_Threshold on a 4G/5G Dual Connectivity Network. A methodology to adjust inter-RAT measuring procedure in a 4G/5G E-UTRAN new radio—dual connectivity (EN-DC) network is described. Proposed solution aims at improving traffic offloading to 5G while reducing signal overhead and battery drainage.

Transferring of data is split between LTE and 5G, control of dual-connectivity is always in the hands of the eNB. A 5G EN-DC UE consists of: LTE unit (RX/TX radio+protocol stack) and additional 5G unit (RX/TX radio+protocol stack), thus the 5G EN-DC UEs can receive data from LTE and 5G simultaneously, which increase data rate. When UE wants to exchange data with the network it establishes a connection with the LTE network. If the eNB has an 'integrated' gNB and if the UE indicates support for EN-DC on the frequency band the gNB is operated on, the LTE eNB will instruct the UE to make measurements on the 5G channel. If UE finds a candidate gNB, the eNB will then communicate to the gNB and give it all necessary parameters to establish a connection to the UE as well. Once the gNB confirms the connection setup, the eNB will then forward a part of the incoming user data the gNB for transmission to the UE. Optionally, the eNB can then ask the core network S-GW to directly exchange user data with the gNB. In this case the gNB will then forward a part of the user data to the eNB.

Smart selection of B1-Threshold for secondary gNB (SgNB) addition is critical to allow traffic offload to 5G. Aggressive B1-Threshold may yield to higher likelihood to detect SgNB. However, UE battery may drain faster, and UE throughput may deteriorate. On the other hand, relaxed B1-Threshold may yield to lower likelihood to detect SgNB (especially if gNBs are not located at eNB-cell edge), and less impact on UE battery life and UE throughput.

In some embodiments, a central node global control located on the core network (e.g., mobile edge compute (MEC), self-organized network (SON) or RAN intelligent controller (RIC)) is utilized for adjusting scanning period interval conducted by a communication device capable of dual connectivity. The central node (e.g., a processor of a device comprising set of instructions) keeps track of the 5G gNB deployment and location in comparison to LTE eNBs. The central node estimates the likelihood that a UE, attached to eNB, is within the gNB coverage. For example, based on gNB coverage area and location of the UE, estimating a probability value (y) indicating a likelihood of the UE connecting to a gNB. If the y is high (e.g. above a pre-defined threshold), the central node can command eNB to send updated B1_Threshold and Inter-RAT measuring gap pattern to the UE. Updated values should be more aggressive to encourage gNB detection, e.g., B1_Threshold=−80 db, and Measurement Gap pattern=0. If the y is low (e.g., below a pre-defined threshold) the central node can command eNB to send a more relaxed B1_Threshold and Inter-RAT measuring gap to the UE. Conversely, algorithm can decide not to update these values (B1_Threshold are usually selected to only trigger at cell edge, e.g. B1_Threshold=−120 db). It should be noted that aggressive B1_Threshold and Inter-RAT measuring gap pattern may impact UE throughput, since UE requests to stop TX & RX activities during measuring gaps. Therefore, proposed solutions herein take into consideration the UE throughput/application-requirements when selecting y.

In some embodiments, based on the estimation, if the likelihood that a UE will connect to a gNB, then the central node adjusts frequency of measurement conducted by a communication device capable of dual connectivity. The B1-Threshold may be used to determine the likelihood of successful connection to gNB. In some embodiments, the central node may adjust B1-Threshold based on the likelihood that a given UE is within the gNB coverage, based on multiple conditions.

In some embodiments, estimate y based on eNB vs gNB overlapping coverage. For example, eNB covers area size A and 2 gNB deployed within its coverage, each gNB covers area size a, thus for all UEs attached to eNB set y=2*a/A.

In some embodiments, estimate y based on UE reporting and estimated gNB coverage. eNB sets y=AGGRESSIVE at early stage of the gNB deployment for all UEs. Some UEs will then detect and report gNBs, algorithm will collect UE GPS location and gNB signal strength. Algorithm will estimate gNB footprint within eNB coverage based on these reports. Once this is done, algorithm will command eNB to change y to RELAXED for all UEs, and create customize y for each UE based on its current location and gNB coverage.

In some embodiments, utilize UE throughput/application-requirements together with either estimating based on overlapping coverage or estimate based on UE reporting. Example, If UE is engaged in VoLTE call and higher data rate is not needed, use y=RELAXED. After call has ended, estimate y based on either estimating based on overlapping coverage or estimate based on UE reporting.

In some embodiments, if the UE has high mobility then set the y=RELAXED, because it is not necessary that UE attach to 5G cell since it is going to handover to another cell soon (signaling overhead, and battery drainage).

According an embodiment, a system can comprise a processor and a memory that stores executable instructions that, when executed by the processor, facilitate performance of operations comprising based on a first network node coverage area and a location of a communication device, estimating a probability value indicating a likelihood of the communication device connecting to a first network node device. The system can further facilitate based on the probability value, determining a scanning period interval value used by the communication device during a scanning procedure to establish a connection with the first network node device and facilitate requesting the communication device to utilize the scanning period interval value during establishment of the connection with the first network node device.

According to another embodiment, described herein is a method that can comprise estimating, by a device comprising a processor, a value indicating a likelihood of a communication device connecting to a first network node device, wherein the value is estimated based on a first network node coverage area and a location of the communication device. The method can further comprise determining, by the device, based on the value, a scanning period interval value utilized by a scanning procedure to establish a connection from the communication device to the first network node device. The method can further comprise communicating, by the device, the scanning period interval value to the communication device and requesting, by the device, the communication device to adjust the scanning procedure.

According to yet another embodiment, a device can comprise a processor and a memory that stores executable instructions that, when executed by the processor, facilitate performance of operations comprising determining a probability value, wherein the probability value indicates a likelihood of a communication device, connected to a first network node device, connecting to a second network node device with attempts below a first threshold. The device can further comprise determining a scanning period interval value based on the probability value, used by the communication device, to adjust a scanning procedure usable for establishment of a connection with the second network node device, and requesting the communication device to utilize the scanning period interval value during the establishment of the connection with the second network node device.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment (UE) can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
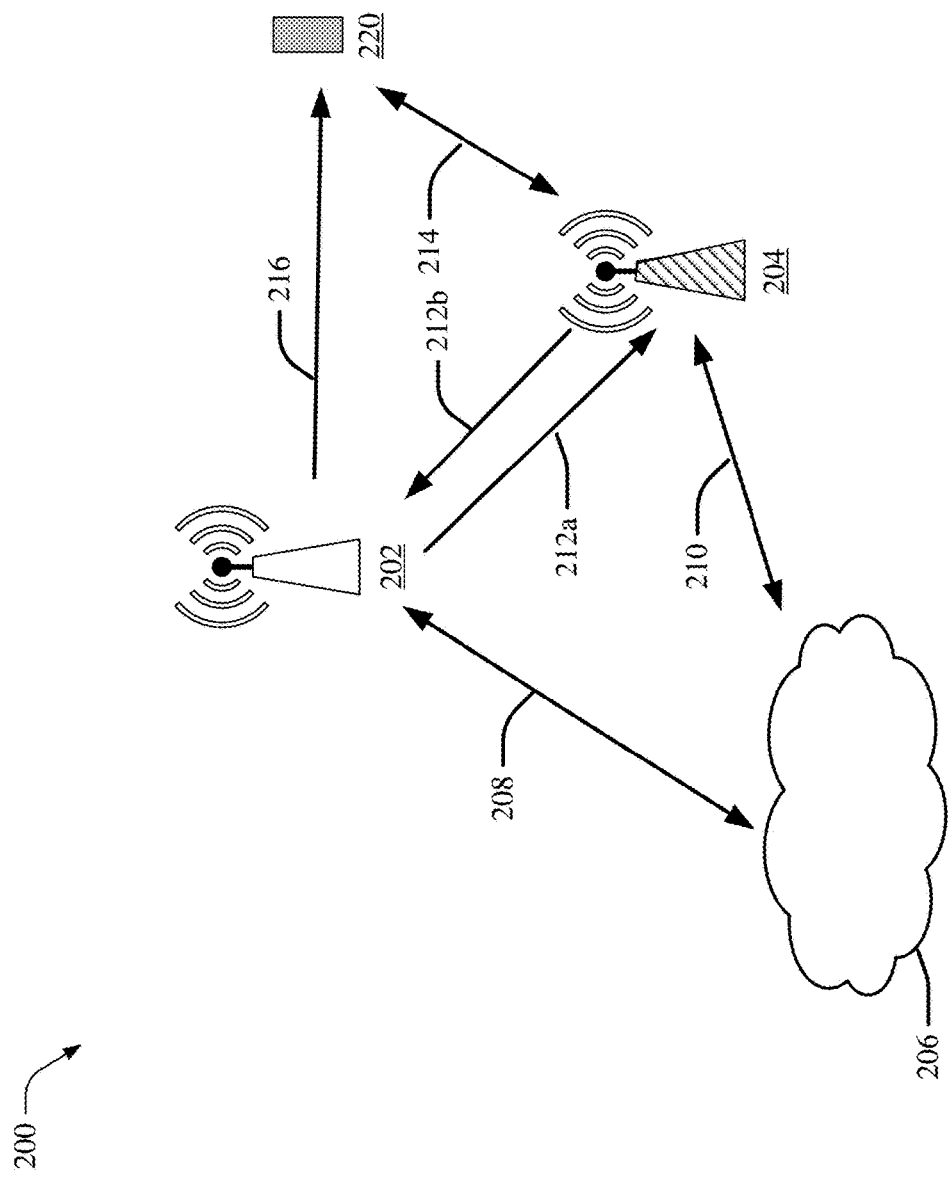
FIG. 2 illustrates an example network architecture for a new radio with dual connectivity in accordance with various aspects and embodiments described herein.

FIG. 2 illustrates an example network architecture 200 for an E-UTRAN new radio dual connectivity in accordance with various aspects and embodiments described herein. For example, the network 200, comprises a gNB 202 (e.g., a 5G network node device or base station) and an eNB 204 (e.g., LTE network node device or base station), both can be communicative connected to and use the LTE core network 206. The LTE eNB 204 can be referred to primary eNB to indicate that is the primary network node device controlling secondary 5G NR base station (e.g., SgNB). In the exemplary network architecture 200, S1 interface 208 and 210 are utilized to communicate with core network 206. X2 interfaces 212a and 212b are utilized to communicate between eNB 204 and gNB 202. A UE 220 capable of dual connectivity is able to receive data from eNB 204 over primary interface 214 and from gNB over secondary interface 216. In some embodiments, the UE 220 in attached to eNB 204 as the primary base station.

Figure 3:
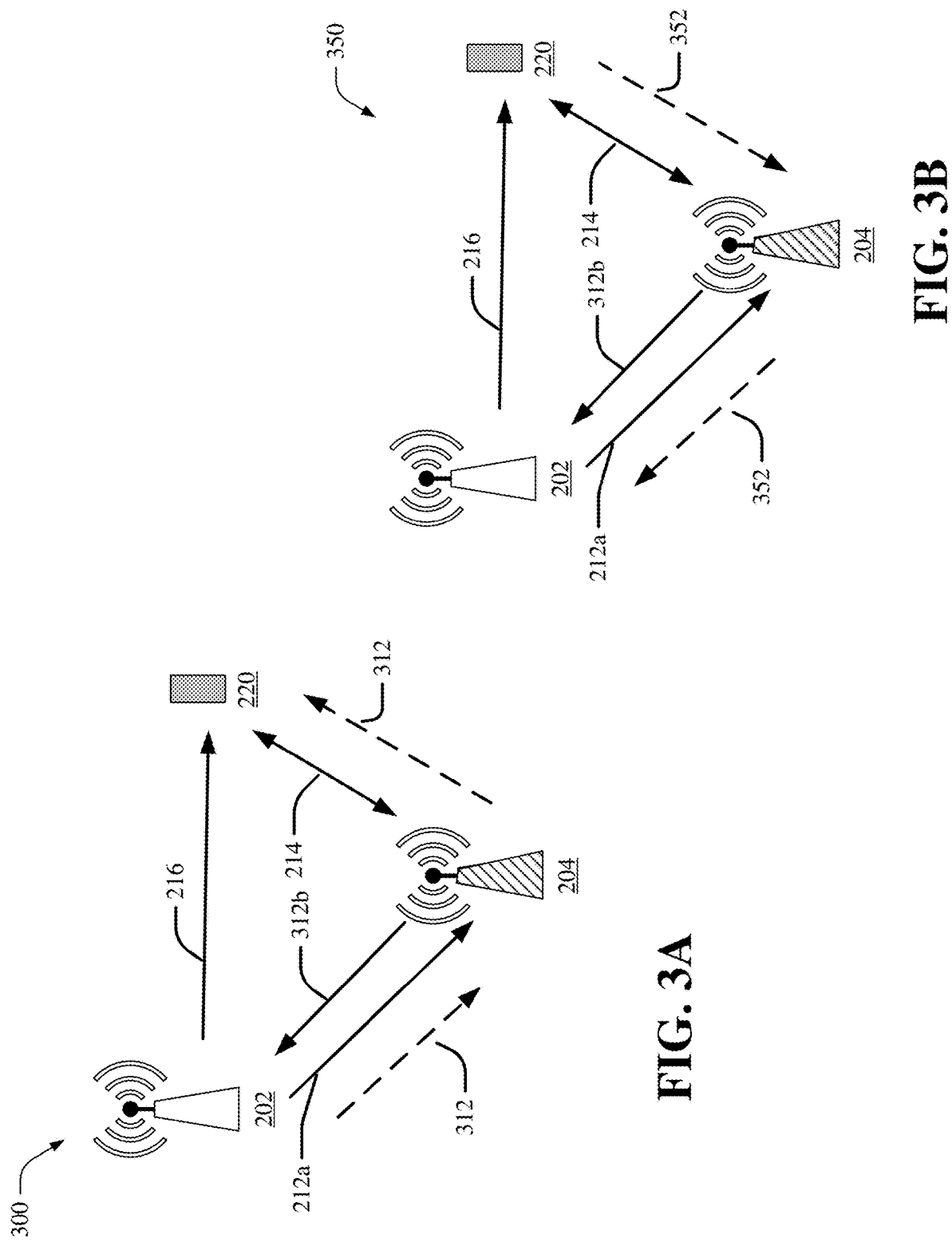
FIG. 3A illustrates an example network architecture for a new radio with dual connectivity in accordance with various aspects and embodiments described herein.
FIG. 3B illustrates an example network architecture for a new radio with dual connectivity in accordance with various aspects and embodiments described herein.

FIG. 3A illustrates an example network architecture 300 for an E-UTRAN new radio dual connectivity in accordance with various aspects and embodiments described herein. As illustrated, the gNB provides NR measurement configurations 312 to UE via eNB 204 using X2 interface 212a (e.g., interface between gNB 202 and eNB 204) and primary interface 214 (e.g., interface between eNB 204 and UE 220).

FIG. 3B illustrates an example network architecture 300 for an E-UTRAN new radio dual connectivity in accordance with various aspects and embodiments described herein. As illustrated, the gNB can receive RRC 5G measurement report 352 from UE 220 indirectly over eNB 204 via X2AP:RRC transfer message using primary interface 214 and the X2 interface 212b.

Figure 4:
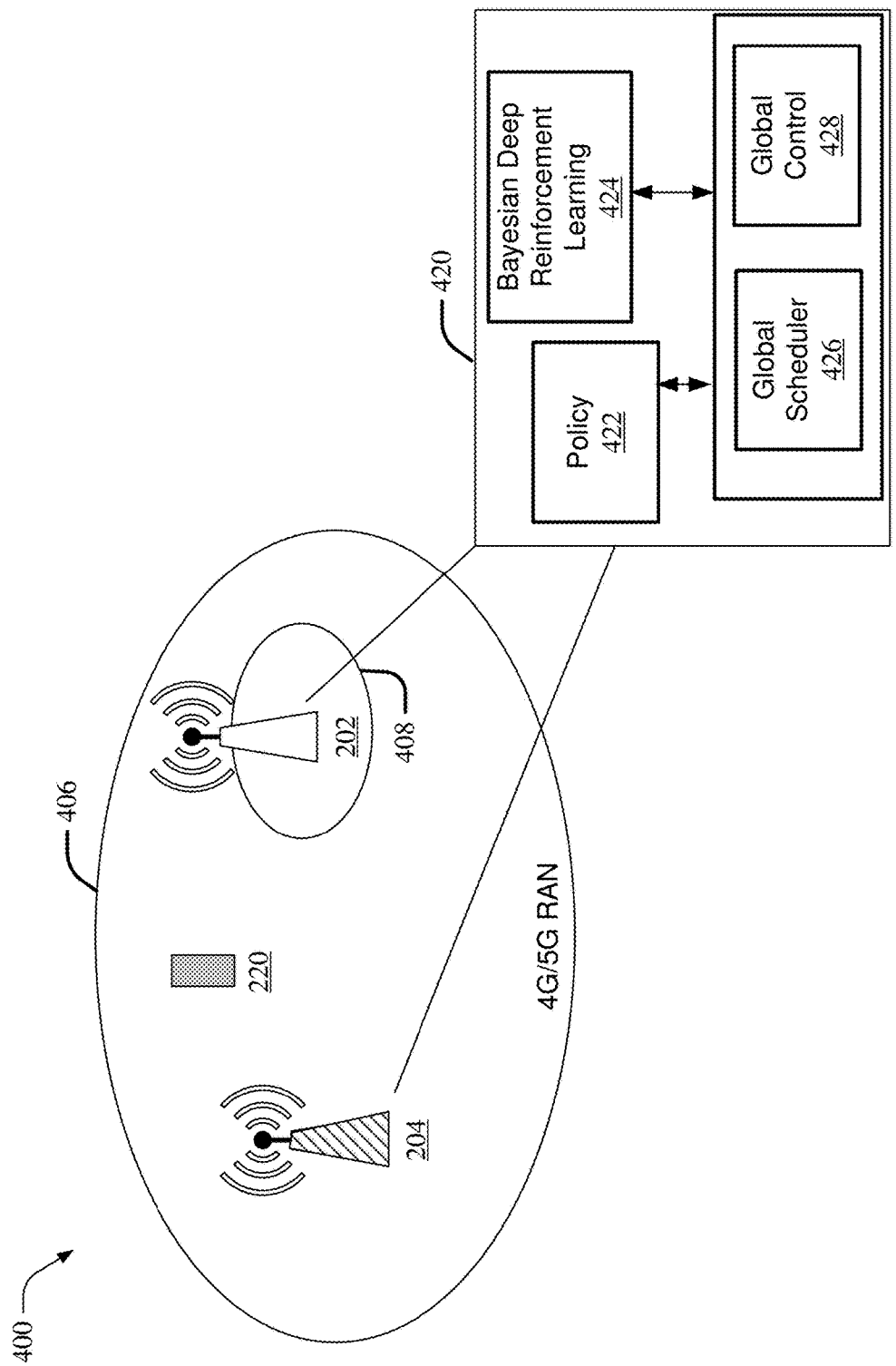
FIG. 4 illustrates an exemplary communication between core network and network nodes of new radio with dual connectivity in accordance with various aspects and embodiments described herein.

FIG. 4 illustrates an exemplary communication 400 between core network and network nodes of E-UTRAN new radio dual connectivity network architecture in accordance with various aspects and embodiments described herein. As illustrated, the eNB 204 has a primary communication coverage area 406. Within the primary communication coverage area 406, there is a gNB 202 which has a secondary communication coverage area 408. The UE 220 operating in the primary communication coverage area 406 may be able receive data from both eNB 204 and gNB 202 if the UE 220 has dual connectivity and is able to connect to gNB 202. Both eNB 204 and gNB 202 are communicatively connected to a core network 420 (e.g., MEC, SON or RIC). The core network 420 comprises a policy component 422 and Bayesian Deep Reinforcement Learning (BDRL) component 424 which are communicatively connected to a global scheduler 426 and a global control component 428. In some embodiments, the global control component 428 tracks 5G gNB deployment and location in comparison to LTE eNBs. The BDRL component 424 determines the likelihood that given UE 220, which is attached to the eNB 204, is within the gNB 202 coverage area (e.g., secondary communication coverage area 408). If the likelihood of UE 220 connecting to the gNB is high, then the global scheduler 426 can adjust the frequency of measurements conducted by the UE 220 to be aggressive (e.g., aggressive measurements—constantly taking measurements until connection is established). Otherwise, the global scheduler 426 can adjust the frequency of measurements conducted by the UE 220 to be relaxed (e.g., relaxed measurements—minimal to no measurement conducted). In several embodiments, the components, for example, global control component 428, can comprise one or more computer and/or machine readable, writable, and/or executable components and/or instructions that, when executed by a processor, can facilitate performance of operations defined by such component(s) and/or instruction(s).

It should be appreciated that the embodiments of the subject disclosure depicted in various figures disclosed herein are for illustration only, and as such, the architecture of such embodiments are not limited to the systems, devices, and/or components depicted therein. For example, in some embodiments the global control component 428 can comprise various computer and/or computing-based elements described herein with reference to operating environment 900 and FIG. 9. In several embodiments, such computer and/or computing-based elements can be used in connection with implementing one or more of the systems, devices, and/or components shown and described in connection with FIG. 4 or other figures disclosed herein.

Figure 5:
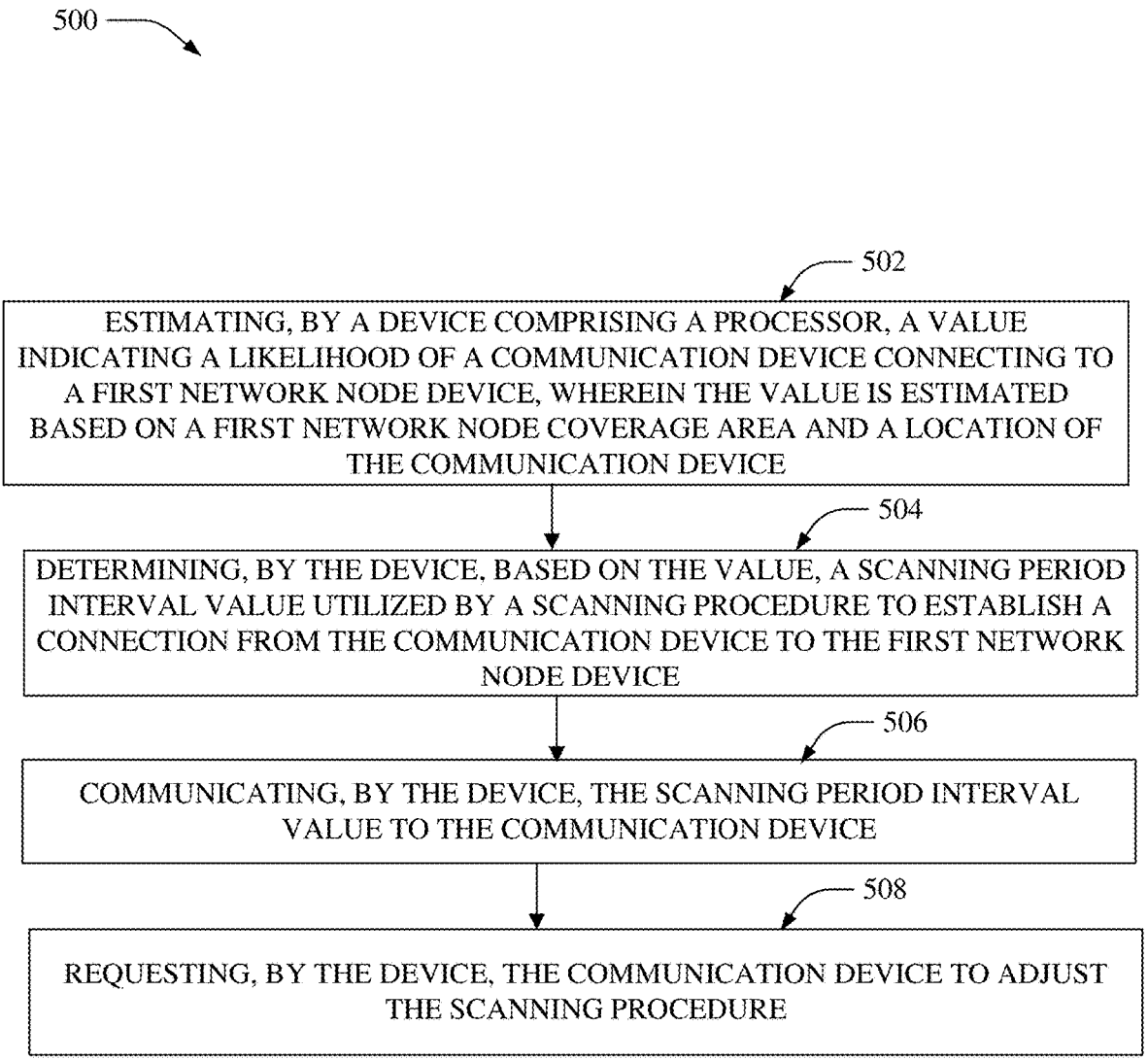
FIG. 5 depicts a diagram of an example, non-limiting computer implemented method that facilitates adjusting scanning period interval conducted by a communication device capable of dual connectivity in accordance with one or more embodiments described herein.

FIG. 5 depicts a diagram of an example, non-limiting computer implemented method that facilitates adjusting scanning period interval conducted by a communication device capable of dual connectivity in accordance with one or more embodiments described herein. In some examples, flow diagram 500 can be implemented by operating environment 900 described below. It can be appreciated that the operations of flow diagram 500 can be implemented in a different order than is depicted.

In non-limiting example embodiments, a computing device (or system) (e.g., computer 902) is provided, the device or system comprising one or more processors and one or more memories that stores executable instructions that, when executed by the one or more processors, can facilitate performance of the operations as described herein, including the non-limiting methods as illustrated in the flow diagrams of FIG. 5.

Operation 502 depicts estimating, by a device comprising a processor, a value indicating a likelihood of a communication device connecting to a first network node device, wherein the value is estimated based on a first network node coverage area and a location of the communication device. Operation 504 depicts determining, by the device, based on the value, a scanning period interval value (e.g., a value indicating the number of times measurement can be conducted) utilized by a scanning procedure (e.g., aggressive or relaxed procedure) to establish a connection from the communication device to the first network node device. Operation 506 depicts communicating, by the device, the scanning period interval value to the communication device. Operation 508 depicts requesting, by the device, the communication device to adjust the scanning procedure (e.g., based on the value indicating likelihood of a connected UE successfully connecting to gNB, either conduct aggressive measurements or relaxed measurements to connect to the gNB).

Figure 6:
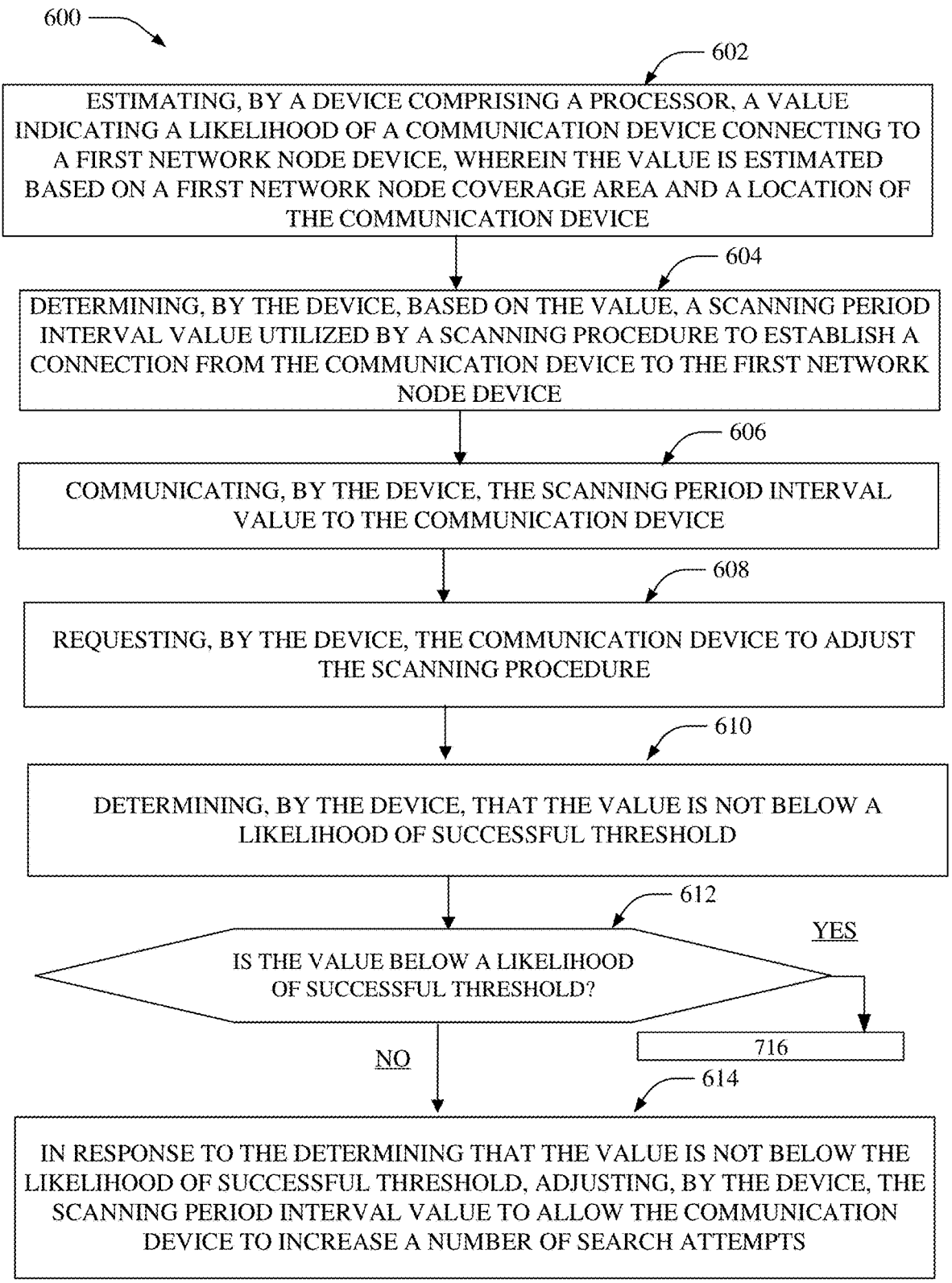
FIG. 6 depicts a diagram of an example, non-limiting computer implemented method that facilitates adjusting scanning period interval conducted by a communication device capable of dual connectivity in accordance with one or more embodiments described herein.

FIG. 6 depicts a diagram of an example, non-limiting computer implemented method that facilitates adjusting scanning period interval conducted by a communication device capable of dual connectivity in accordance with one or more embodiments described herein. In some examples, flow diagram 600 can be implemented by operating environment 900 described below. It can be appreciated that the operations of flow diagram 600 can be implemented in a different order than is depicted.

In non-limiting example embodiments, a computing device (or system) (e.g., computer 902) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts estimating, by a device comprising a processor, a value indicating a likelihood of a communication device connecting to a first network node device, wherein the value is estimated based on a first network node coverage area and a location of the communication device. Operation 604 depicts determining, by the device, based on the value, a scanning period interval value utilized by a scanning procedure (e.g., a procedure used to measure and report neighboring cells) to establish a connection from the communication device to the first network node device. Operation 606 depicts communicating, by the device, the scanning period interval value to the communication device. Operation 608 depicts requesting, by the device, the communication device to adjust the scanning procedure (e.g., based on the value indicating likelihood of a connected UE successfully connecting to gNB, either conduct aggressive measurements or relaxed measurements to connect to the gNB). Operation 610 depicts determining, by the device, that the value is not below a likelihood of successful threshold. Operation 612 depicts determining if the value is below a likelihood of successful threshold. If the value is below a likelihood of successful threshold, then perform operation 714 of FIG. 7 described below. Otherwise, perform operation 614. Operation 614 depicts in response to the determining that the value is not below the likelihood of successful threshold, adjusting, by the device, the scanning period interval value to allow the communication device to increase a number of search attempts.

Figure 7:
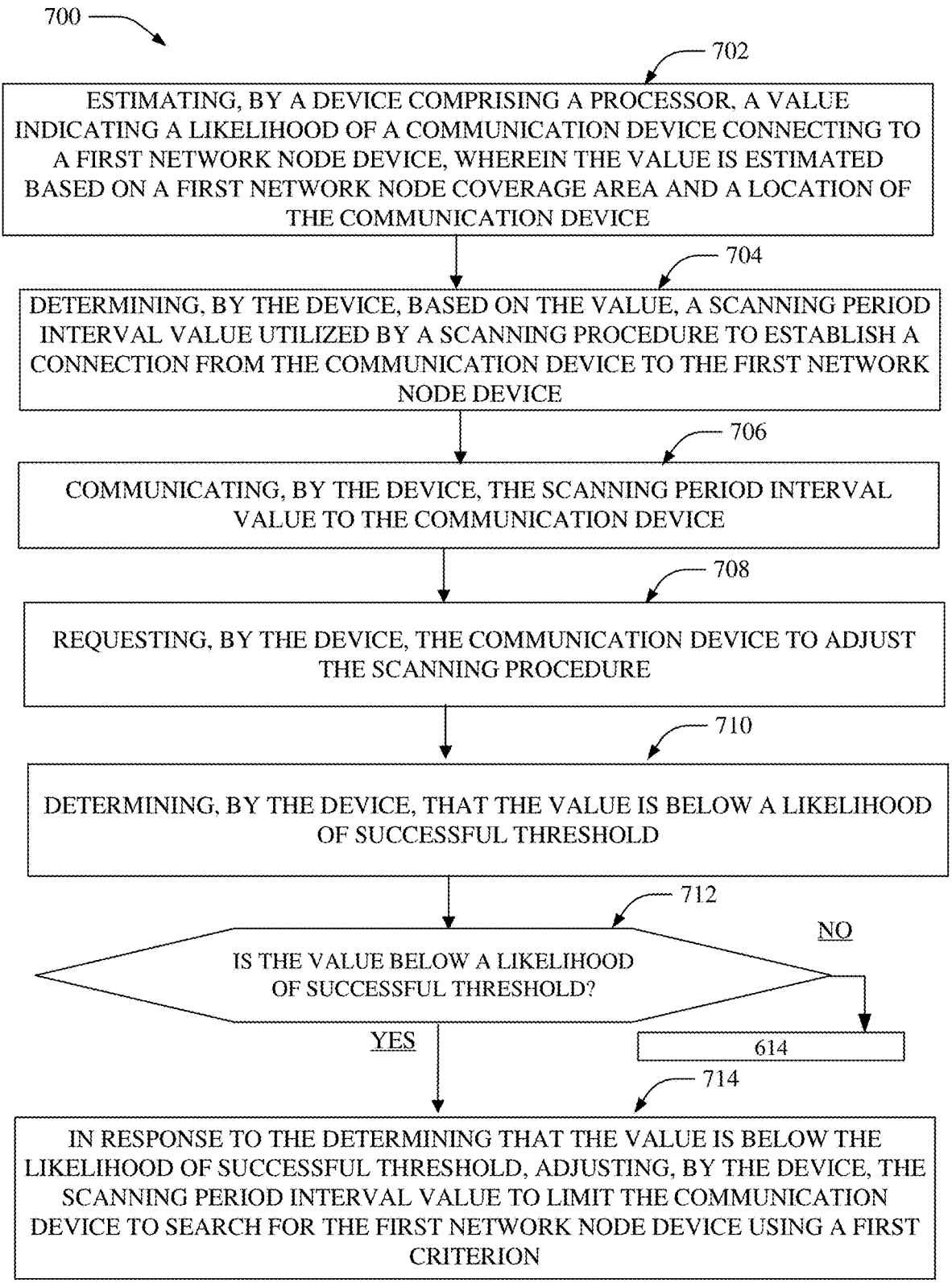
FIG. 7 depicts a diagram of an example, non-limiting computer implemented method that facilitates adjusting scanning period interval conducted by a communication device capable of dual connectivity in accordance with one or more embodiments described herein.

FIG. 7 depicts a diagram of an example, non-limiting computer implemented method that facilitates adjusting scanning period interval conducted by a communication device capable of dual connectivity in accordance with one or more embodiments described herein. In some examples, flow diagram 700 can be implemented by operating environment 900 described below. It can be appreciated that the operations of flow diagram 700 can be implemented in a different order than is depicted.

In non-limiting example embodiments, a computing device (or system) (e.g., computer 902) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts estimating, by a device comprising a processor, a value indicating a likelihood of a communication device connecting to a first network node device, wherein the value is estimated based on a first network node coverage area and a location of the communication device. Operation 704 depicts determining, by the device, based on the value, a scanning period interval value utilized by a scanning procedure (e.g., a procedure used to measure and report neighboring cells) to establish a connection from the communication device to the first network node device. Operation 706 depicts communicating, by the device, the scanning period interval value to the communication device. Operation 708 depicts requesting, by the device, the communication device to adjust the scanning procedure (e.g., based on the value indicating likelihood of a connected UE successfully connecting to gNB, either conduct aggressive measurements or relaxed measurements to connect to the gNB). Operation 710 depicts determining, by the device, that the value is below a likelihood of successful threshold. Operation 712 depicts determining if the value is below a likelihood of successful threshold. If the value is below a likelihood of successful threshold, then perform operation 714. Otherwise, perform operation 614 of FIG. 6 described above. Operation 714 depicts in response to the determining that the value is below the likelihood of successful threshold, adjusting, by the device, the scanning period interval value to limit the communication device to search for the first network node device using a first criterion.

Figure 8:
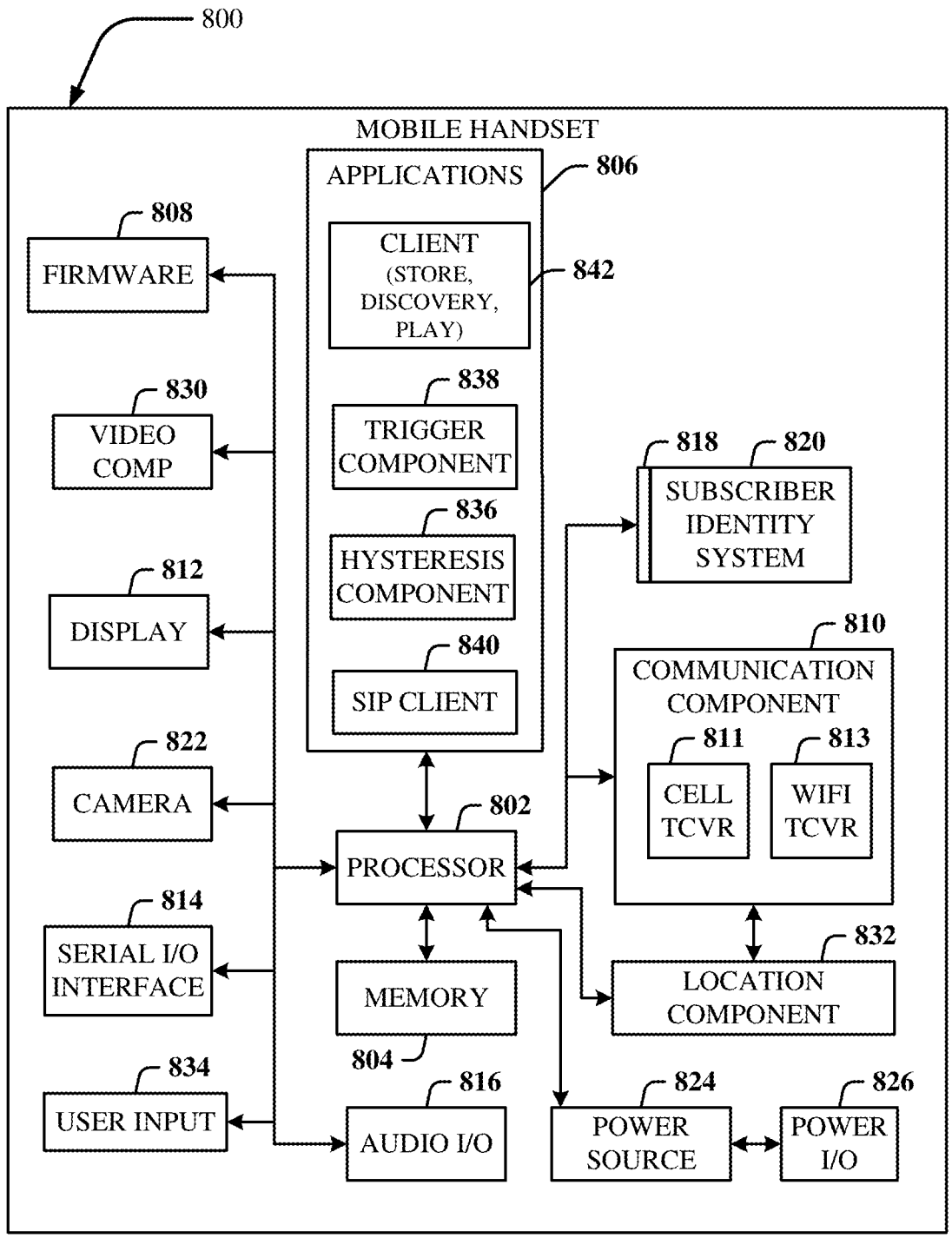
FIG. 8 illustrates an example block diagram of an example mobile handset operable to engage in a system architecture that facilitates wireless communications according to one or more embodiments described herein.

Referring now to FIG. 8, illustrated is an example block diagram of an example mobile handset 800 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 802 for controlling and processing all onboard operations and functions. A memory 804 interfaces to the processor 802 for storage of data and one or more applications 806 (e.g., a video player software, user feedback component software, etc.). Other applications can include voice recognition of predetermined voice commands that facilitate initiation of the user feedback signals. The applications 806 can be stored in the memory 804 and/or in a firmware 808 and executed by the processor 802 from either or both the memory 804 or/and the firmware 808. The firmware 808 can also store startup code for execution in initializing the handset 800. A communications component 810 interfaces to the processor 802 to facilitate wired/wireless communication with external systems, e.g., cellular networks, VoIP networks, and so on. Here, the communications component 810 can also include a suitable cellular transceiver 811 (e.g., a GSM transceiver) and/or an unlicensed transceiver 813 (e.g., Wi-Fi, WiMax) for corresponding signal communications. The handset 800 can be a device such as a cellular telephone, a PDA with mobile communications capabilities, and messaging-centric devices. The communications component 810 also facilitates communications reception from terrestrial radio networks (e.g., broadcast), digital satellite radio networks, and Internet-based radio services networks.

The handset 800 includes a display 812 for displaying text, images, video, telephony functions (e.g., a Caller ID function), setup functions, and for user input. For example, the display 812 can also be referred to as a "screen" that can accommodate the presentation of multimedia content (e.g., music metadata, messages, wallpaper, graphics, etc.). The display 812 can also display videos and can facilitate the generation, editing and sharing of video quotes. A serial I/O interface 814 is provided in communication with the processor 802 to facilitate wired and/or wireless serial communications (e.g., USB, and/or IEEE 894) through a hardwire connection, and other serial input devices (e.g., a keyboard, keypad, and mouse). This can support updating and troubleshooting the handset 800, for example. Audio capabilities are provided with an audio I/O component 816, which can include a speaker for the output of audio signals related to, for example, indication that the user pressed the proper key or key combination to initiate the user feedback signal. The audio I/O component 816 also facilitates the input of audio signals through a microphone to record data and/or telephony voice data, and for inputting voice signals for telephone conversations.

The handset 800 can include a slot interface 818 for accommodating a SIC (Subscriber Identity Component) in the form factor of a card Subscriber Identity Module (SIM) or universal SIM 820, and interfacing the SIM card 820 with the processor 802. However, it is to be appreciated that the SIM card 820 can be manufactured into the handset 800, and updated by downloading data and software.

The handset 800 can process IP data traffic through the communications component 810 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 822 (e.g., a camera) can be provided for decoding encoded multimedia content. The video processing component 822 can aid in facilitating the generation, editing, and sharing of video quotes. The handset 800 also includes a power source 824 in the form of batteries and/or an AC power subsystem, which power source 824 can interface to an external power system or charging equipment (not shown) by a power I/O component 826.

The handset 800 can also include a video component 830 for processing video content received and, for recording and transmitting video content. For example, the video component 830 can facilitate the generation, editing and sharing of video quotes. A location tracking component 832 facilitates geographically locating the handset 800. As described hereinabove, this can occur when the user initiates the feedback signal automatically or manually. A user input component 834 facilitates the user initiating the quality feedback signal. The user input component 834 can also facilitate the generation, editing and sharing of video quotes. The user input component 834 can include such conventional input device technologies such as a keypad, keyboard, mouse, stylus pen, and/or touchscreen, for example.

Referring again to the applications 806, a hysteresis component 836 facilitates the analysis and processing of hysteresis data, which is utilized to determine when to associate with the access point. A software trigger component 838 can be provided that facilitates triggering of the hysteresis component 836 when the Wi-Fi transceiver 813 detects the beacon of the access point. A SIP client 840 enables the handset 800 to support SIP protocols and register the subscriber with the SIP registrar server. The applications 806 can also include a client 842 that provides at least the capability of discovery, play and store of multimedia content, for example, music.

The handset 800, as indicated above related to the communications component 810, includes an indoor network radio transceiver 813 (e.g., Wi-Fi transceiver). This function supports the indoor radio link, such as IEEE-802.11, for the dual-mode GSM handset 800. The handset 800 can accommodate at least satellite radio services through a handset that can combine wireless voice and digital radio chipsets into a single handheld device.

Figure 9:
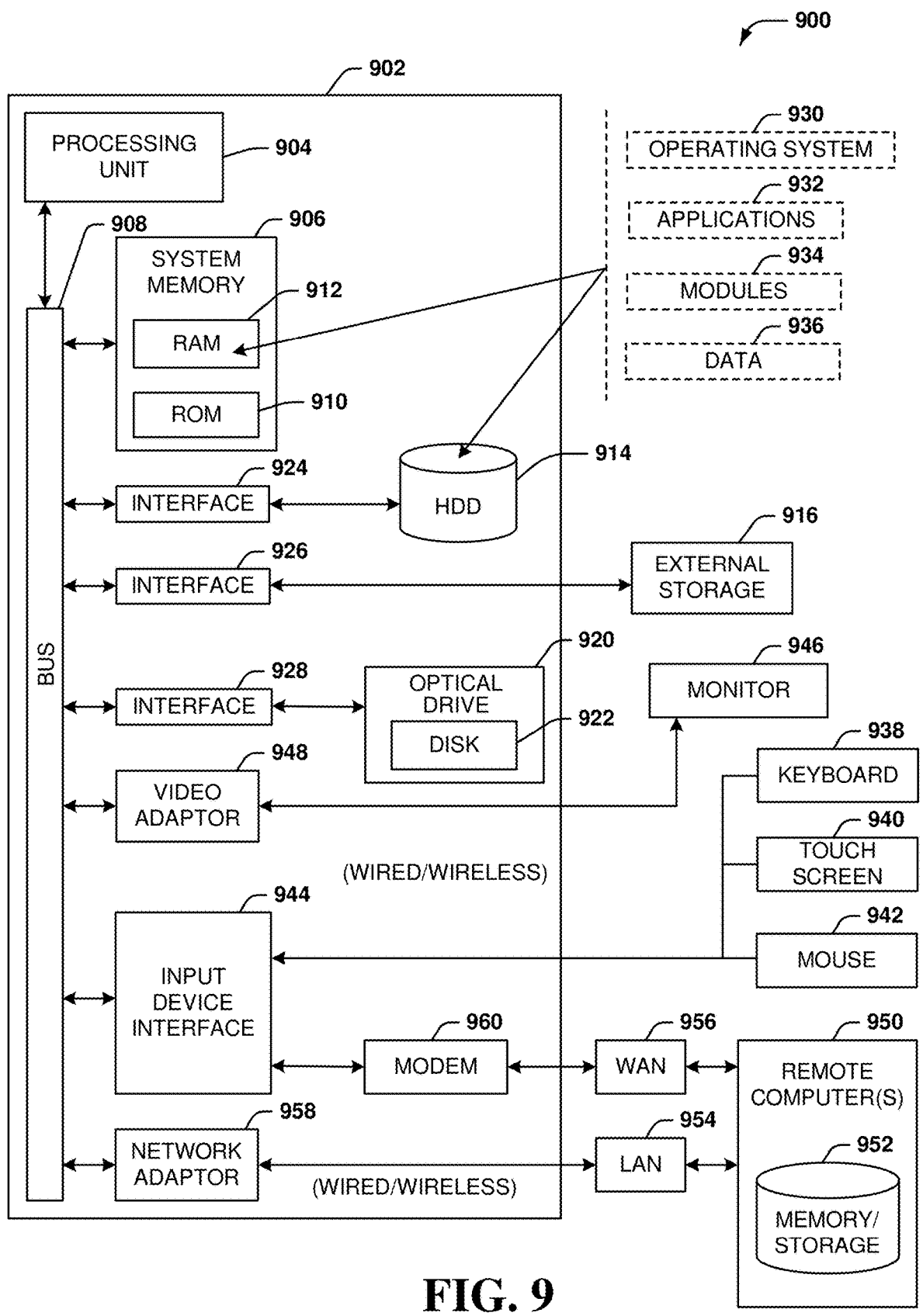
FIG. 9 illustrates an example block diagram of an example computer operable to engage in a system architecture that facilitates secure wireless communication according to one or more embodiments described herein.

Referring now to FIG. 9, illustrated is an example block diagram of an example computer 900 operable to engage in a system architecture that facilitates wireless communications according to one or more embodiments described herein. The computer 900 can provide networking and communication capabilities between a wired or wireless communication network and a server and/or communication device.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example operating environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any datastream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the description is not to be limited to any single implementation, but rather is to be construed in breadth, spirit and scope in accordance with the appended claims.

What is claimed is:

1. A system, comprising:
   a processor; and
   a memory that stores executable instructions that, when executed by the processor, facilitate performance of operations, comprising:
      based on a first network node coverage area and a location of a communication device, estimating a probability value indicating a likelihood of the communication device connecting to a first network node device;
      based on the probability value, determining a scanning period interval value used by the communication device during a scanning procedure to establish a connection with the first network node device; and
      requesting the communication device to utilize the scanning period interval value during establishment of the connection with the first network node device.

2. The system of claim 1, wherein the operations further comprise:
   determining whether the probability value is above a successful connection threshold value; and
   in response to a result of the determining indicating that the probability value is above the successful connection threshold value, adjusting the scanning period interval value to allow the communication device to increase search attempts.

3. The system of claim 1, wherein the operations further comprise:
   determining whether the probability value is not above a successful connection threshold value; and
   in response to a result of the determining indicating that the probability value is not above the successful connection threshold value, adjusting the scanning period interval value to limit the communication device to search for the first network node device using a first criterion.

4. The system of claim 3, wherein the first criterion is defined by the location of the communication device in relations to the first network node coverage area.

5. The system of claim 3, wherein the first criterion is defined by a distance of the communication device from an edge of the first network node device.

6. The system of claim 1, wherein the estimating the probability value is based on a size of a coverage area of the first network node device.

7. The system of claim 1, wherein the estimating the probability value comprises setting the probability value to a default value and adjusting the probability value based on measurements collected by the communication device.

8. The system of claim 1, wherein the estimating the probability value is based on an application throughput requirement of an application used by the communication device.

9. A method, comprising:
   estimating, by a device comprising a processor, a value indicating a likelihood of a communication device connecting to a first network node device, wherein the value is estimated based on a first network node coverage area and a location of the communication device;
   determining, by the device, based on the value, a scanning period interval value utilized by a scanning procedure to establish a connection from the communication device to the first network node device;
   communicating, by the device, the scanning period interval value to the communication device; and
   requesting, by the device, the communication device to adjust the scanning procedure.

10. The method of claim 9, further comprising:
    determining, by the device, that the value is not below a likelihood of successful threshold; and
    in response to the determining that the value is not below the likelihood of successful threshold, adjusting, by the device, the scanning period interval value to allow the communication device to increase a number of search attempts.

11. The method of claim 9, further comprising:
    determining, by the device, that the value is below a likelihood of successful threshold; and
    in response to the determining that the value is below the likelihood of successful threshold, adjusting, by the device, the scanning period interval value to limit the communication device to search for the first network node device using a first criterion.

12. The method of claim 11, wherein the first criterion is defined by the location of the communication device in relation to a coverage area associated with the first network node device.

13. The method of claim 11, wherein the first criterion is defined by a distance of the communication device from an edge associated with the first network node device.

14. The method of claim 9, wherein the estimating the value is based on a size of a coverage area of the first network node device.

15. The method of claim 9, wherein the estimating the value comprises setting the value to a default value and adjusting the value from the default value based on measurements collected by the communication device.

16. The method of claim 9, wherein the estimating the value is based on an application throughput requirement of an application used by the communication device.

17. A machine-readable storage medium, comprising executable instructions that, when executed by a processor, facilitate performance of operations, comprising:

determining a probability value, wherein the probability value indicates a likelihood of a communication device, connected to a first network node device, connecting to a second network node device with attempts below a first threshold;

determining a scanning period interval value based on the probability value, used by the communication device, to adjust a scanning procedure usable for establishment of a connection with the second network node device; and requesting the communication device to utilize the scanning period interval value during the establishment of the connection with the second network node device.

18. The machine-readable storage medium of claim 17, wherein the operations further comprise:

determining that the probability value is above a likelihood of successful threshold value; and in response to the determining that the probability value is above the likelihood of successful threshold value, adjusting the scanning period interval value to allow the communication device to increase search attempts.

19. The machine-readable storage medium of claim 17, wherein the operations further comprise:

determining that the probability value is not above a likelihood of successful threshold value; and in response to the determining that the probability value is not above the likelihood of successful threshold value, adjusting the scanning period interval value to limit the communication device to search for the first network node device using a first criterion.

20. The machine-readable storage medium of claim 17, wherein the estimating the probability value is based on a mobility value associated with the communication device.

\* \* \* \* \*